April 21, 1959

H. R. HYDER 2,883,532

BIPOLAR CLAMPING CIRCUIT

Filed Sept. 2, 1955

2 Sheets-Sheet 1

INVENTOR.
HARRY R. HYDER
BY
Killman and Kerst
ATTORNEYS.

April 21, 1959 H. R. HYDER 2,883,532

BIPOLAR CLAMPING CIRCUIT

Filed Sept. 2, 1955 2 Sheets-Sheet 2

INVENTOR.
HARRY R. HYDER
BY
Killman and Kerst
ATTORNEYS.

United States Patent Office 2,883,532
Patented Apr. 21, 1959

2,883,532

BIPOLAR CLAMPING CIRCUIT

Harry R. Hyder, Baltimore, Md., assignor to Bendix Aviation Corporation, Towson, Md., a corporation of Delaware Application September 2, 1955, Serial No. 532,134

2 Claims. (Cl. 250—27)

This invention relates to a means for clamping a waveform, having repetitive excursions of either polarity, to a reference voltage level during the intervals between said excursions. One of the problems to which it has particular application is that of clamping the sawtooth excursions of a sweep voltage used in precision radar indicators of the plan position indication type.

The conventional ways of attempting a solution to this problem make use of either a dual-triode clamping circuit or a four-diode clamping circuit as illustrated, for example, on page 131 of the textbook by Soller, Starr and Valley entitled "Cathode Ray Tube Displays" published in 1948 by McGraw-Hill Book Co., Inc., New York, N.Y., which is volume 22 of the "Radiation Laboratory series." These configurations have been necessary because the polarity of the sweep waveform may be either positive or negative. These circuits, however, present a number of defects which are troublesome under normal conditions and become intolerable in a high precision tracking indicator.

One of these defects resides in the fact that the conduction of triodes or diodes used in these circuits is not the same for all tubes. This results in different clamping actions for waves of opposite polarity, unless the tubes in the circuit are perfectly matched.

Another defect lies in the variation of conduction of the triodes or diodes at different voltage levels. Conduction is highest at high voltage levels and decreases greatly at low voltage levels where it is most important. This decrease of conduction at low levels prevents the circuit from clamping exactly to the reference level.

An ideal clamping circuit should have zero resistance in a forward direction and infinite resistance in a backward direction.

It is an object of this invention to provide a bipolar clamping circuit in which the defects set forth above have been substantially eliminated.

It is a further object of this invention to provide a bipolar clamping circuit having a very low forward resistance and a substantially infinite backward resistance.

It is another object of the invention to provide a bipolar clamping circuit having a very high degree of clamping accuracy.

These and other objects and advantages of the invention are realized by a clamping circuit making use of a direct coupled, unity gain, negative feedback amplifier having high loop gain. The input of the amplifier is connected to the reference voltage and the output is applied to the waveform to be clamped. The amplifier is gated by a negative squarewave which starts at the beginning of the sweep waveform and ends with the end of the sweep.

Figures 1, 2:
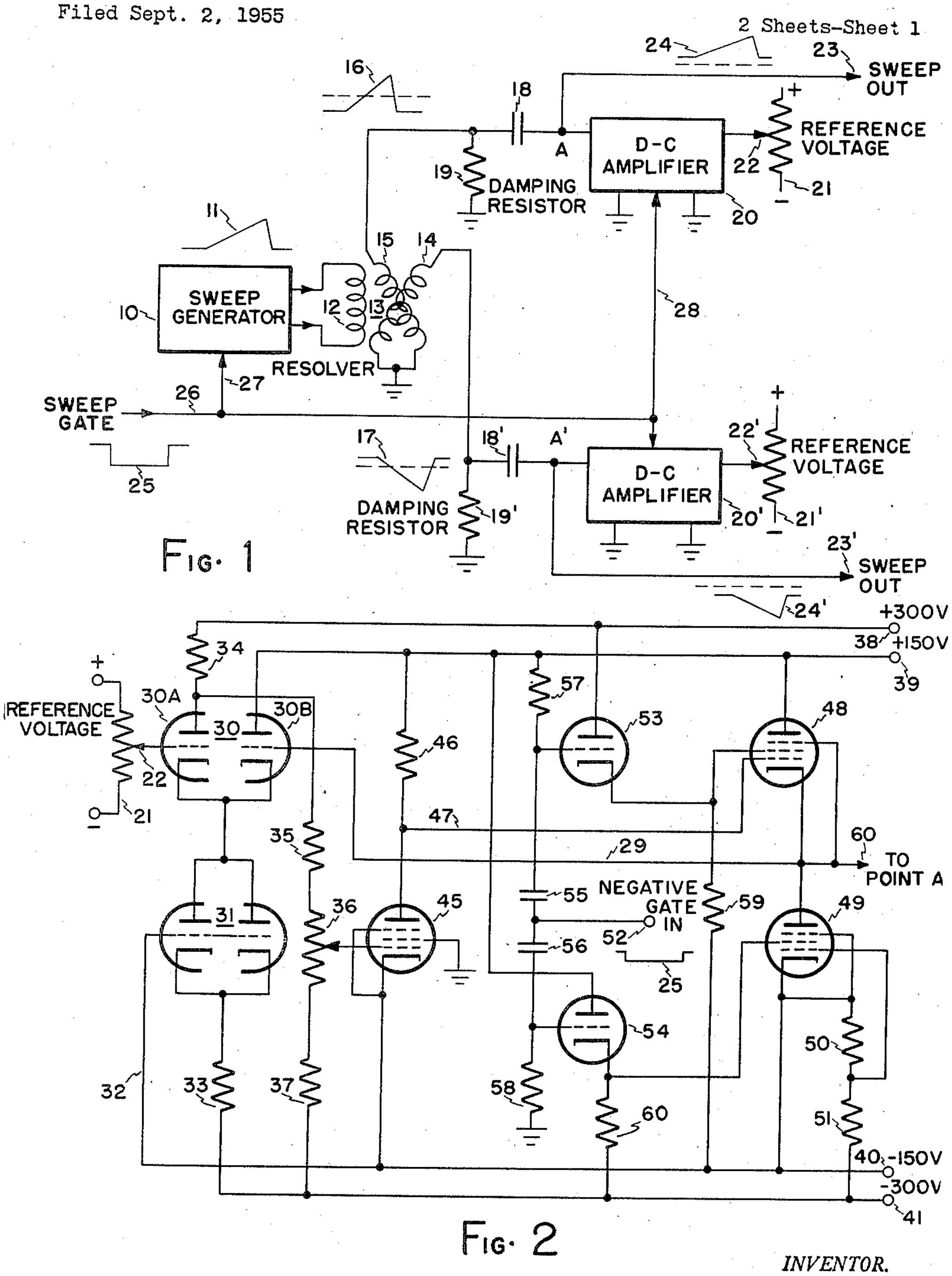
Fig. 1 is a schematic circuit diagram of a sweep generator circuit incorporating the instant invention.
Fig. 2 is a circuit diagram of the clamping portion of the circuit of Fig. 1; and, Figs. 3 and 4 are circuit diagrams of alternative forms of the clamping circuit.

Referring now more particularly to the drawing, there is shown a sweep voltage generator circuit indicated by the box 10, the output of which is a positive sawtooth voltage illustrated by the graph 11. This voltage is applied to the rotor winding 12 of a resolver 13. The stator of this resolver is composed of two windings 14 and 15 which are so oriented and coupled to the rotor 12 as to have induced in them sawtooth voltages having respective polarities and amplitudes which are functions of the position of the rotor 12. These voltages are represented by the graphs 16 and 17 and each voltage will vary in both amplitude and polarity as the position of the rotor 12 changes. The voltage induced in the coil 15 is coupled to a point A by way of a capacitor 18 which is shunted to ground by a damping resistor 19.

A D.C. amplifier 20 has its input connected to a reference voltage. The source of this voltage is indicated here by a potentiometer 21 having a tap 22 connected to the amplifier. The output of the amplifier 20 is applied to the point A. The output of the circuit is taken from the point A and applied to an output terminal as indicated at 23, the form of the output being represented by the graph 24.

Gating voltage as indicated by the graph 25 is applied by conductor 26 and branch conductor 27 to the sweep generator 10 where it is used to trigger the beginning and end of the sweep excursion. It is also applied by the conductor 26 and branch conductor 28 to the D.C. amplifier 20, being utilized to turn the amplifier on and off.

The voltage induced in the winding 14 of the stator of the resolver 13 is applied to a channel illustrated in the lower portion of the figure and identical with that just described. In the drawing the corresponding components are identified by the same reference characters primed.

The D.C. amplifier is illustrated in detail in Fig. 2. It comprises a first stage illustrated as a dual-triode 30 composed of tubes 30A and 30B, which acts as a differential amplifier. The reference voltage from the tap 22 is applied to the grid of tube 30A and the feedback voltage from the D.C amplifier is applied by the conductor 29 to the grid of tube 30B. The cathodes of this amplifier are connected directly together and to the plates of a twin-triode 31. The grids of tubes 31 are connected to a terminal 40 of a source of negative voltage, indicated as having a value of minus 150 volts, by means of a conductor 32. The cathodes of the dual-triode 31 are connected together and through a resistor 33 to a terminal 41 of a source of negative voltage indicated as having a value of minus 300 volts. The twin-triode 31, though preferable since it maintains the gain of tubes 30A and 30B nearer to equality, may, if desired be replaced by a high valued resistor.

The plate of the triode 30A is connected through a resistor 34 to a terminal 38 of a source of positive voltage indicated as having a value of plus 300 volts. The plate of the triode 30B is directly connected to a terminal 39 of a source of voltage indicated as having a value of plus 150 volts. The junction point of the resistor 34 and the plate of the tube 30A is connected by way of a voltage divider comprising resistors 35, 36 and 37 to the terminal 41. The resistor 36 is connected by means of a movable tap to the control grid of a high gain pentode 45 having its cathode connected to the terminal 40 and its plate connected by way of a load resistor 46 to the terminal 39. The junction of the resistor 46 and the plate of this tube is connected by means of a conductor 47 to the control grid of a pentode 48.

The plate of this tube is connected directly to the terminal 39 and its cathode is connected directly to the conductor 29 and thus to the control grid of tube 30B. The cathode of tube 48 is also connected to the plate of a pentode 49 which acts as a constant current cathode load for the tube 48. The cathode of tube 49 is directly connected to the terminal 40 and by way of a pair of serially connected resistors 50 and 51 to the terminal 41. The control grid is connected to the junction of resistors 50 and 51.

Negative gating voltage as indicated by the graph 25 is applied to the circuit by way of a terminal 52 which is connected to the respective control grids of a pair of triodes 53 and 54 by way of condensers 55 and 56. The control grid of tube 53 is connected to the terminal 39 by way of a resistor 57. The control grid of tube 54 is connected to ground by way of a resistor 58. The plates of tubes 53 and 54 are directly connected to the respective terminals 38 and 39. The cathodes of tubes 53 and 54 are directly connected to the respective screen grids of tubes 48 and 49. The cathode of tube 53 is also connected by way of a resistor 59 to the terminal 40, and the cathode of tube 54 is connected by way of a resistor 60 to the terminal 41.

In the operation of the circuit of Fig. 2, the output of the dual-triode 30 is applied to the control grid of high gain pentode 45, where it is amplified and inverted and applied to the control grid of tube 48 which operates as a cathode follower output stage. The presence of a constant current cathode load for this tube, which function is performed by the pentode 49, is necessary to the operation of the circuit since, if resistance were used, the output would go to the negative supply voltage when the negative gate voltage was applied to the circuit. Tubes 53 and 54 are cathode followers supplying screen voltage to tubes 48 and 49, respectively. When the negative gate voltage 25 is applied to the tubes of grids 53 and 54 cutting off the plate currents, the screens of tubes 48 and 49 go to a point 150 volts more negative than their respective cathodes, thus cutting off the plate currents of these tubes and causing the amplifier output to look like an open circuit. The output of the circuit is taken from terminal 60 directly connected to the cathode of tube 48.

The large amount of the negative feedback from the tube 48 by way of the conductor 29 to the control grid of tube 30B, which may amount to 60 db, causes the amplifier to be very accurate and stable. For the highest order of clamping accuracy, a low drift tube should be used for the differential amplifier. Clamping accuracy of the order of plus or minus 1/10 volt has been realized with the circuit such as described above.

Figures 3, 4:
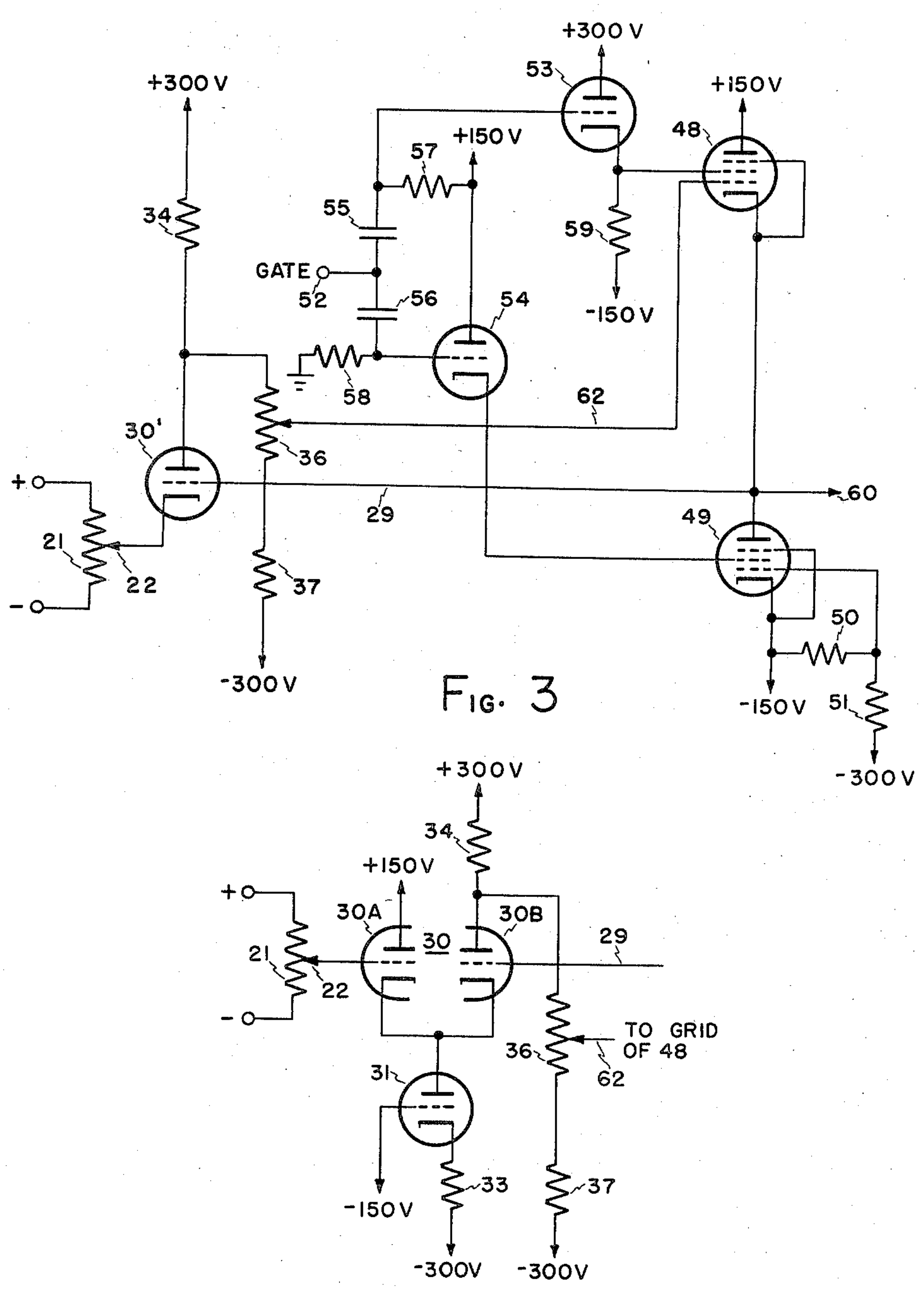

Other forms of differential amplifier than that shown in Fig. 2 may be used. Fig. 3 shows a form of the invention which, while it will not provide the high gain of the circuit of Fig. 2, will provide satisfactory results at lower gain levels with considerable circuit simplification.

In this version, the twin-triode 30 has been replaced by a single triode 30′ having its cathode connected to the movable tap 22 of the potentiometer 21. The plate is connected to a source of negative voltage indicated as having a value of minus 300 volts, by way of the serially connected resistors 36 and 37. A tap 61 is connected to the control grid of tube 48 by a conductor 62. The grid of tube 30′ is connected to conductor 29.

This version of the circuit does away with the tube 45, since no phase inversion is required. The dual-triode 31 is also no longer required. The tube 30′ may be a pentode, if desired.

The form of the circuit illustrated in Fig. 3 requires the reference source to have a moderate impedance. Where the reference source has a high impedance a modified version of this circuit, shown in Fig. 4, may be used. This arrangement also eliminates the tube 45 but requires either a constant current coupling tube 31 or a high valued resistor. The dual-triode 30 is again made use of with the tube 30A acting as a cathode follower by virtue of the presence of the cathode loading tube 31. It is preferred to use the tube 31 instead of a high valued resistor in the cathode circuit of the dual-triode 30, since its use maintains the gains of the tubes 30A and 30B nearer to the desired state of equality. The resistor 34 is in the plate circuit of the tube 30B and the junction of this resistor and the plate is connected through resistors 36 and 37 to minus 300 volts and through a tap on resistor 36 and the conductor 62 to the control grid of tube 48.

The input to the grid of tube 30A undergoes a positive gain as it is applied by way of the direct coupled cathodes to the tube 30B and thence by way of conductor 62 and tube 48 to the terminal 60. This potential applied to the control grid of tube 30B by conductor 29 is inverted and amplified in tube 30B, thus undergoing the same gain in a negative sense before being applied through tube 48 to the terminal 60.

The application of the gating voltage to the tubes 48 and 49 in the latter versions of the circuit remains the same as in the form of Fig. 2.

What is claimed is:

1. Means in an electrical circuit for intermittently clamping a point thereof to a reference voltage, comprising a direct current amplifier having input and output terminals, means applying said reference voltage to an input terminal of said amplifier, means forming a negative feedback path between an output and an input terminal of said amplifier, said amplifier comprising a first pentode tube connected as the final stage thereof and having control grid and gating grid electrodes, a source of supply voltage having a positive terminal thereof connected to the anode of said pentode, a second pentode having control grid and gating grid electrodes and having its anode connected to the cathode of said first pentode and its cathode connected to a negative terminal of said source of supply voltage, means coupling signals in said feedback path to said control grid of said first pentode for amplification thereby, means applying a voltage pulse concurrently to said gating grid of each of said pentodes in a manner to interrupt current flow through each of said pentodes, and means connecting the cathode of said first pentode to said point.

2. In a circuit for generating an intermittent waveform including a source of gating voltage and means applying said gating voltage to said circuit in a manner such that the leading edge of said gating voltage initiates said waveform and the trailing edge thereof terminates said waveform; means for coupling said waveform to a point in said circuit and means for clamping said point to a reference voltage when said waveform is not being applied thereto, said clamping means comprising: a direct current amplifier, said amplifier having input and output terminals, a source of said reference voltage, means applying voltage from the last named source to an input terminal of said amplifier, means forming a negative feedback path between an output and an input terminal of said amplifier, said amplifier comprising a first pentode tube connected as the final stage thereof and having control grid and gating grid electrodes, a source of supply voltage having a positive terminal thereof connected to the anode of said pentode, a second pentode having control grid and gating grid electrodes and having its anode connected to the cathode of said first pentode and its cathode connected to a negative terminal of said source of supply voltage, means coupling signals in said feedback path to said control grid of said first pentode for amplification thereby, means applying said gating voltage to said gating grid of each of said pentodes in a manner such that the leading edge thereof interrupts current flow therethrough and the trailing edge thereof initiates current flow therethrough, and means connecting the cathode of said first pentode to said point.

References Cited in the file of this patent

UNITED STATES PATENTS

| | | |
|---|---|---|
| 2,466,712 | Kenyon | Apr. 2, 1949 |
| 2,468,687 | Schmitt | Apr. 26, 1949 |
| 2,578,268 | Sherwin | Dec. 11, 1951 |
| 2,627,031 | Moore | Jan. 31, 1953 |
| 2,640,883 | Buchner | June 2, 1953 |
| 2,658,167 | Harris | Nov. 3, 1953 |
| 2,683,858 | Hersh et al. | July 13, 1954 |
| 2,684,443 | Tidball | July 20, 1954 |
| 2,741,723 | Pacini | Apr. 10, 1956 |
| 2,762,010 | Rose et al. | Sept. 4, 1956 |